US011929538B2

(12) United States Patent
Jing et al.

(10) Patent No.: US 11,929,538 B2
(45) Date of Patent: Mar. 12, 2024

(54) RF DIELECTRIC FILTER WITH SURFACE MOUNT RF SIGNAL INPUT/OUTPUT STRUCTURE

(71) Applicant: CTS Corporation, Lisle, IL (US)

(72) Inventors: Dong Jing, San Diego, CA (US); Gabriel Lopez, Tijeras, NM (US); Nam Phan, Rio Rancho, NM (US)

(73) Assignee: CTS Corporation, Lisle, IL (US)

( * ) Notice: Subject to any disclaimer, the term of this patent is extended or adjusted under 35 U.S.C. 154(b) by 0 days.

(21) Appl. No.: 17/551,311

(22) Filed: Dec. 15, 2021

(65) Prior Publication Data

US 2022/0200113 A1 Jun. 23, 2022

Related U.S. Application Data

(60) Provisional application No. 63/126,785, filed on Dec. 17, 2020.

(51) Int. Cl.
*H01P 1/208* (2006.01)
*H01P 1/20* (2006.01)

(52) U.S. Cl.
CPC .................................. *H01P 1/2002* (2013.01)

(58) Field of Classification Search
CPC ........ H01P 1/2002; H01P 1/207; H01P 1/208; H01P 1/2088; H01P 1/20; H01P 1/201; H01P 3/16; H01P 3/122; H01P 3/12
See application file for complete search history.

(56) References Cited

U.S. PATENT DOCUMENTS

| | | | |
|---|---|---|---|
| 6,677,837 | B2 | 1/2004 | Kojima et al. |
| 7,956,708 | B2 | 6/2011 | Bates et al. |
| 9,130,257 | B2 | 9/2015 | Vangala |

FOREIGN PATENT DOCUMENTS

| | | | | |
|---|---|---|---|---|
| CN | 108365308 | A | 8/2018 | |
| EP | 3065213 | A1 | 9/2016 | |
| JP | 2002111329 | A * | 12/2002 | ................ H01P 7/06 |
| JP | 3902072 | B2 | 1/2007 | |
| WO | 2002067358 | A1 | 8/2002 | |

OTHER PUBLICATIONS

Konishi, Y. "Novel dielectric waveguide components-microwave applications of new ceramic materials." Proceedings of the IEEE 79.6 (1991): 726-740.

International Search Report and Written Opinion for Application No. PCT/US2021/063494 dated Mar. 14, 2022 (17 pages).

* cited by examiner

*Primary Examiner* — Stephen E. Jones
(74) *Attorney, Agent, or Firm* — Michael Best & Friedrich LLP

(57) ABSTRACT

A RF dielectric filter comprising a block of dielectric material including top and bottom exterior longitudinal surfaces and side exterior surfaces covered with a layer of conductive material. RF signal input/output pads are located at opposed ends of the block. Each of the RF signal input/output pads comprises a strip of conductive material bridging between the bottom exterior surface and the side exterior surface. A strip or region of dielectric material surrounds all the sides of the elongate strip of conductive material except for one end of the strip of conductive material on the side exterior surface which is in a direct unitary coupling relationship with the remainder of the conductive material on the side exterior surface. In one embodiment, the strip or region of dielectric material is generally U-shaped and can vary in width.

19 Claims, 5 Drawing Sheets

RF DIELECTRIC FILTER WITH SURFACE MOUNT RF SIGNAL INPUT/OUTPUT STRUCTURE

CROSS-REFERENCE TO RELATED APPLICATION

This patent application claims priority and benefit of the filing date of U.S. Provisional Patent Application Ser. No. 63/126,785 filed on Dec. 17, 2020, the disclosure and contents of which are expressly incorporated herein in its entirety by reference.

FIELD OF THE INVENTION

The invention relates generally to an RF dielectric filter and, more specifically, to a surface mount RF signal input/output structure for an RF dielectric filter and, still more specifically, to a surface mount RF signal input/output structure for an RF dielectric waveguide filter.

BACKGROUND OF THE INVENTION

Various types of RF filters are known for filtering RF signals.

Ceramic monoblock filters are low cost, small and easy to manufacture. However, they have relatively high insertion loss, slow roll-off and low power handling capability.

Air cavity filters have low loss, fast roll-off, less spurious and high rejection However, they are usually large in size, heavy, and relatively expensive. Although air cavity filters can be made smaller, the performance degrades significantly as the size decreases.

Dielectric waveguide filters have good insertion loss, fast roll-off, high rejection and are relatively small.

The present invention is directed to a RF dielectric filter and more specifically to an RF dielectric waveguide filter with a new surface mount RF signal input/output structure.

SUMMARY OF THE INVENTION

The present invention is generally directed to a RF dielectric filter comprising a block of dielectric material including a plurality of exterior surfaces including top and bottom exterior longitudinal surfaces, opposed side exterior longitudinal surfaces, and opposed exterior end surfaces, at least a first RF signal input/output pad extending between the bottom exterior surface and one of the opposed side exterior longitudinal surfaces or one of the opposed exterior end surfaces, wherein the at least first RF signal input/output pad comprises an elongate strip of conductive material extending between the bottom exterior surface and one of the opposed side exterior longitudinal surfaces or one of the opposed exterior end surfaces, and a strip or region of dielectric material surrounding all of the sides of the elongate strip of conductive material except for one side of the elongate strip of conductive material located on the one of the opposed side exterior longitudinal surfaces or the one of the opposed exterior end surfaces.

In one embodiment, the strip or region of dielectric material is generally U-shaped and surrounds all of the sides of the elongate strip of conductive material except for a top side of the elongate strip of conductive material located on the one of the opposed side exterior longitudinal surfaces or the one of the opposed exterior end surfaces.

In one embodiment, opposed portions of the strip or region of dielectric material located on the one of the opposed side exterior longitudinal surfaces or the one of the opposed exterior end surfaces have a width different than the remainder of the strip or region of dielectric material.

In one embodiment, the opposed portions of the strip or region of dielectric material located on the one of the opposed side exterior longitudinal surfaces or the one of the opposed exterior end surfaces have a width greater than the width of the remainder of the strip or region of dielectric material.

In one embodiment, a second RF signal input/output pad extends between the bottom exterior surface and the one of the opposed side exterior longitudinal surfaces or the other of the opposed exterior end surfaces.

In one embodiment, the second RF signal input/output pad comprises an elongate strip of conductive material extending between the bottom exterior surface and one of the opposed side exterior longitudinal surfaces or the other of the opposed exterior end surfaces, and a strip or region of dielectric material surrounding all of the sides of the elongate strip of conductive material except for one side of the elongate strip of conductive material located on the one of the opposed side exterior longitudinal surfaces or the other of the opposed exterior end surfaces.

In one embodiment, the block of dielectric material defines a longitudinal axis, the first and second RF signal input/output pads being disposed in a diametrically opposed relationship at opposed ends of the block and further in a relationship co-linear with the longitudinal axis of the block of dielectric material.

In one embodiment, the block of dielectric material defines a longitudinal axis, the first and second RF signal input/output pads being disposed in a diametrically opposed relationship at opposed ends of the block and further in a relationship spaced and off-set from the longitudinal axis of the block of dielectric material.

In one embodiment, the block of dielectric material defines a plurality of resonators.

In one embodiment, the block of dielectric material defines a plurality of direct RF signal couplings between the plurality of resonators.

In one embodiment, the block includes a plurality of slots defined in the block of dielectric material and defining a plurality of bridges of dielectric material, the plurality of bridges defining the plurality of direct RF signal couplings between the plurality of resonators.

The present invention is also directed to an RF dielectric filter comprising block of dielectric material including top and bottom exterior longitudinal surfaces and side exterior surfaces covered with a layer of conductive material, first and second RF signal input/output pads located at opposed ends of the block, each of the RF signal input/output pads comprising a strip of conductive material bridging between the bottom exterior surface and the side exterior surface, and a strip or region of dielectric material surrounds all the sides of the elongate strip of conductive material except for one end of the strip of conductive material on the side exterior surface which is in a direct unitary coupling relationship with the remainder of the conductive material on the side exterior surface.

In one embodiment, the RF dielectric waveguide filter comprises a block of dielectric material including a plurality of exterior surfaces including top and bottom exterior longitudinal surfaces, opposed side exterior longitudinal surfaces, and opposed exterior end surfaces, and first and second RF signal input/output pads extending between the bottom exterior surface and one of the opposed side exterior longitudinal surfaces or one of the opposed exterior end surfaces, wherein each of the first and second RF signal input/output pads comprises an elongate strip of conductive material extending between the bottom exterior surface and one of the opposed side exterior longitudinal surfaces or one of the opposed exterior end surfaces; and a generally U-shaped strip or region of dielectric material surrounding all of the sides of the elongate strip of conductive material except for one side of the elongate strip of conductive material located on the one of the opposed side exterior longitudinal surfaces or the one of the opposed exterior end surfaces, wherein opposed portions of the generally U-shaped strip or region of dielectric material located on the one of the opposed side exterior longitudinal surfaces or the one of the opposed exterior end surfaces have a width different than the remainder of the strip or region of dielectric material.

In one embodiment, the dielectric RF filter further comprises a plurality of resonators defined on the block of dielectric material between the first and second RF signal input/output pads, and a plurality of slots defined in the block of dielectric material and defining a plurality of bridges of dielectric material, the plurality of bridges defining a plurality of direct RF signal couplings between the plurality of resonators.

The present invention is further directed to an RF dielectric filter comprising a block of dielectric material including a plurality of exterior surfaces including top and bottom exterior longitudinal surfaces and exterior side surfaces, a layer of conductive material covering the plurality of exterior surfaces of the block of dielectric material, first and second RF signal input/output pads bridging the bottom exterior surface and an exterior side surface of the block of dielectric material, wherein each of the first and second RF signal input/output pads comprises an elongate strip of conductive material bridging the bottom exterior surface and the exterior side surface and including an end unitary with the layer of conductive material on the exterior side surface, and a strip or region of dielectric material surrounding the elongate strip of conductive material with the exception of the end of the elongate strip of conductive material on the exterior side surface which is unitary with the layer of conductive material on the exterior side surface.

In one embodiment, the strip or region of dielectric material is generally U-shaped.

In one embodiment, the strip or region of dielectric material located on the side exterior surface has a width different than the remainder of the strip or region of dielectric material.

In one embodiment, the block of dielectric material includes opposed ends and opposed end side exterior surfaces, the first and second RF signal input/output pads being located at the opposed ends of the block of dielectric material, the first and second RF signal input/output pads each comprising an elongate strip of conductive material bridging the bottom exterior surface and respective ones of the opposed end exterior side surfaces and including an end unitary with the layer of conductive material on the respective ones of the opposed exterior end side surfaces and a strip or region of dielectric material surrounding the elongate strip of conductive material with the exception of the end of the elongate strip of conductive material on the respective ones of the opposed exterior end side surfaces unitary with the layer of conductive material on the respective ones of the opposed exterior end side surfaces.

In one embodiment, the block of dielectric material includes opposed ends and a first exterior longitudinal side surface, the first and second RF signal input/output pads being located at the opposed ends and bridging between the bottom exterior surface and the first exterior longitudinal side surface, each of the first and second RF signal input/output pads including an elongate strip of conductive material bridging between the bottom exterior surface and the first exterior longitudinal side surface and including an end unitary with the layer of conductive material on the first exterior longitudinal side surface and a strip or region of dielectric material surrounding the elongate strip of conductive material with the exception of the end of the elongate strip of conductive material on the first exterior longitudinal side surface.

In one embodiment, the block of dielectric material defines a plurality of resonators, the block of dielectric material defining a plurality of direct RF signal couplings between the plurality of resonators.

Other advantages and features of the present invention will be more readily apparent from the following detailed description of the preferred embodiments of the invention, the accompanying drawings, and the appended claims.

BRIEF DESCRIPTION OF THE DRAWINGS

These and other features of the invention can best be understood by the following description of the accompanying FIGS. as follows.

DETAILED DESCRIPTION OF THE EMBODIMENTS

Figure 1:
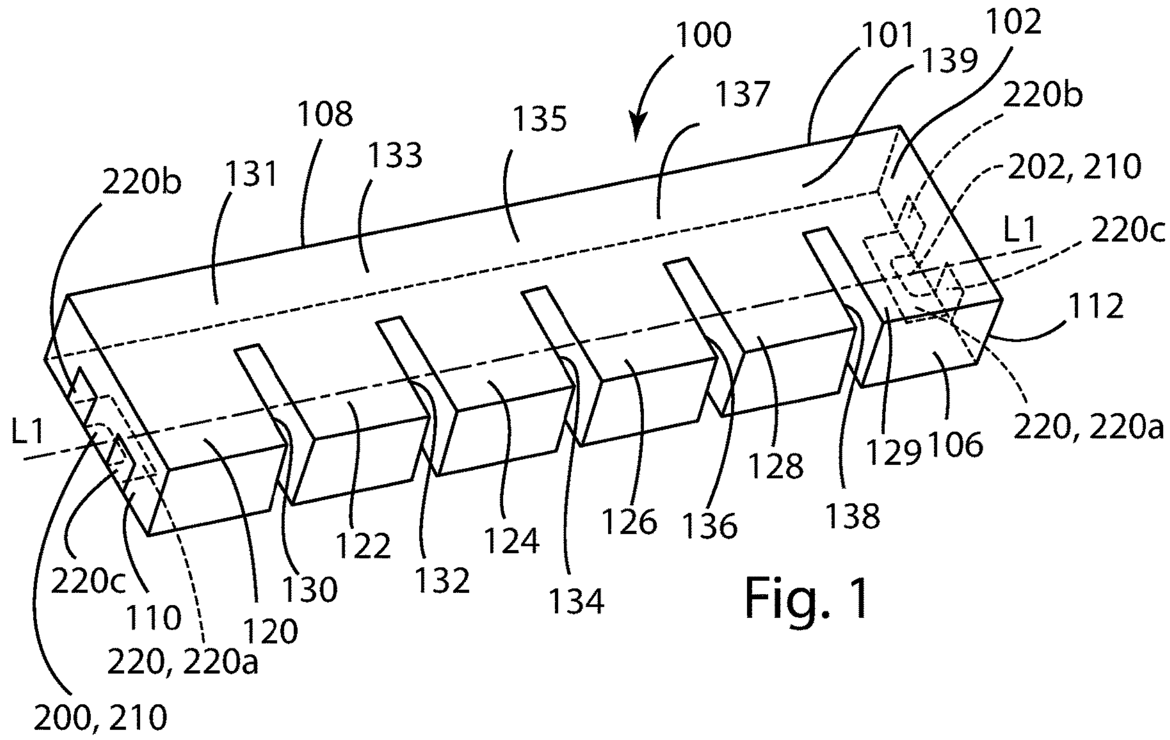
FIG. 1 is a top perspective view of an RF dielectric waveguide filter in accordance with the present invention.

FIGS. 1-4 depict an RF dielectric filter 100 in accordance with the present invention and, more specifically an RF dielectric filter in the embodiment of an RF dielectric waveguide filter 100 adapted for use in, for example, massive MIMO millimeter wave 5G telecommunications applications, that is made from a generally parallelepiped-shaped solid block or core 101 of dielectric/ceramic material that includes opposed longitudinal horizontal exterior top/upper and bottom/lower surfaces 102 and 104, opposed longitudinal side vertical exterior surfaces 106 and 108 disposed in a relationship normal to and extending between the horizontal exterior top and bottom surfaces 102 and 104, and opposed transverse end side vertical exterior end surfaces 110 and 112 disposed in a relationship generally normal to and extending between the longitudinal horizontal exterior surfaces 102 and 104 and the longitudinal vertical exterior surfaces 106 and 108.

Thus, in the embodiment shown, each of the exterior surfaces 102, 104, 106, and 108 extend in the same direction as the longitudinal axis L1 of the filter 100 and each of the exterior end surfaces 110 and 112 extend in a direction transverse or normal to the direction of the longitudinal axis L1 of the filter 100.

The filter 100 includes a plurality of resonant sections or regions 120, 122, 124, 126, 128, and 129 which extend along the length of the block 101 of the filter 100 in a spaced apart and generally parallel relationship relative to each other and further in a relationship generally transverse to the longitudinal axis L1 of the filter 100.

The plurality of resonant sections 120, 122, 124, 126, 128, and 129 are separated from each other by a plurality of slits or slots 130, 132, 134, 136, and 138 extending along the length of and into the dielectric material of the block 101 in a spaced-apart and parallel relationship. In the embodiment shown, each of the respective slits or slots 130, 132, 134, 136, and 138 extend vertically through the body of the block 101 and terminate in elongate openings in the top and bottom exterior surfaces 102 and 104 and the side exterior vertical surface 106 of the block 101 of the filter 100. Moreover, in the embodiment shown, each of the slits or slots 130, 132, 134, 136, and 138 extend inwardly into the body of the block 101 from the exterior side longitudinal surface 106 and terminate at a point short of the opposed exterior side longitudinal surface 108.

In the embodiment shown, the slots 130, 132, 134, 136, and 138 are elongate and generally rectangular shaped. Although not shown in any of the figures, it is understood that the slots 130, 132, 134, 136, and 138 may be of any other suitable shape or configuration including for example one or more closed circular openings or slots defined in the interior of the block 101.

In the embodiment shown, the slits or slots 130, 132, 134, 136, and 138 extend in a relationship generally transverse or normal to and intersecting the longitudinal axis L1 of the filter 100 with the slit or slot 130 separating the resonant sections 120 and 122, the slit or slot 132 separating the resonant sections 122 and 124, the slit or slot 134 separating the resonant sections 124 and 126, the slit or slot 136 separating the resonant sections 126 and 128, and the slit or slot 138 separating the resonant sections 128 and 129.

Each of the slits or slots 130, 132, 134, 136, and 138 define respective bridges 131, 133, 135, 137, and 139 of dielectric material in the body of the block 101 which define respective inductive direct transmission RF signal transmission paths D1, D2, D3, D4 and D5 between the respective resonant sections 120, 122, 124, 126, 128, and 129.

In the embodiment shown, all the exterior surfaces 102, 104, 106, 108, 110, and 112 of the block 101 including the interior surfaces of the respective slits/slots 130, 132, 134, and 136 are covered with a layer of suitable conductive/metallic material such as, for example, a layer of silver material with the exception of portions of the exterior surfaces defining the respective input/output pads 200 and 202 as described in more detail below.

The filter 100, and more specifically the block 101 thereof, further defines and includes a pair of exterior RF signal transmission input/output pads 200 and 202.

Figure 2:
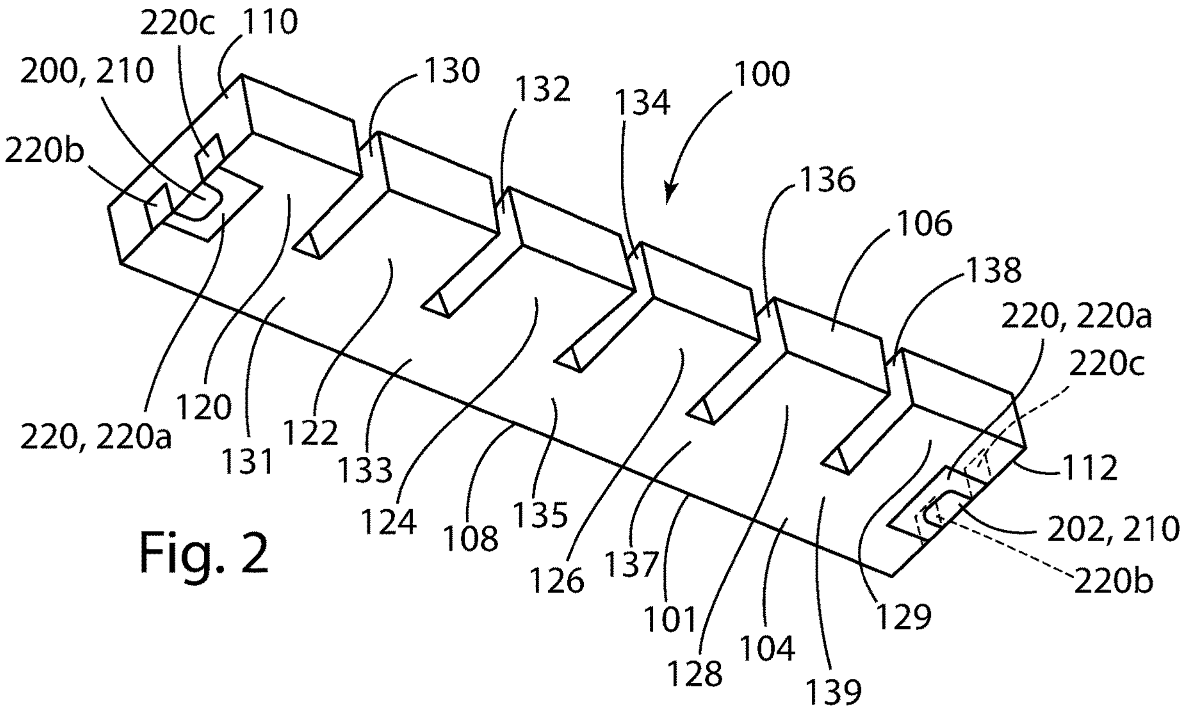
FIG. 2 is a bottom perspective of the RF dielectric waveguide filter shown in FIG. 1.

In the embodiment of FIGS. 1 and 2, the RF signal transmission input/output pads 200 and 202 are located at the respective opposed ends of the block 101 and, still more specifically, located on the respective end resonators 120 and 129. In the embodiment of FIGS. 1 and 2, the pads 200 and 202 are disposed in a diametrically opposed and co-linear relationship relative to each other and further in a relationship co-linear with the longitudinal axis L1 of the block 101 and still, more specifically, in a relationship between, spaced from, and parallel to, the opposed side exterior surfaces 106 and 108.

The pad 200 is comprised of an elongate generally rectangularly shaped strip or region of conductive material 210 which is formed on the exterior lower horizontal surface 104 of the block 101, extends and bridges around the corner defined between the lower horizontal surface 104 and the side exterior transverse end surface 110, and terminates on and extends into and is unitary with and is in electrical direct coupling or coupled relationship with the conductive material formed on the side exterior transverse end surface 110.

In the embodiment shown, the strip or region of conductive material 210 is not an isolated island of conductive material but rather a strip or region of conductive material surrounded on less than all of its sides and, in the embodiment shown, surrounded on only three of its four sides by a generally U-shaped strip or region 220 on the exterior surface of the block 101 which is devoid of conductive material (i.e., a generally U-shaped strip or region of exposed dielectric material 220 of the block 101 that surrounds all of the sides of the strip of conductive material 210 with the exception of the top side or end of the strip of conductive material 210 on the side exterior surface 110 of the block 101 which is unitary with and extends into and is in electrical coupling or coupled relationship with the remainder of the conductive material on the side exterior surface 110 and thus in direct electrical coupling or coupled relationship with the circuit of the filter 100).

More specifically, the strip or region 220 is comprised of a first region or strip 220*a* on the lower exterior block surface 104 that surrounds the portion of the strip of conductive material 210 formed on the lower exterior horizontal surface 104 of the block 101 and respective second regions or strips 220*b* and 220*c* of dielectric material which extend unitarily from opposed ends of the first region or strip 220*a* of dielectric material on the lower exterior block surface 104, are formed on the side exterior vertical end surface 110, and are located on opposed sides of the portion of the strip of conductive material 210 which is formed on the side exterior vertical end block surface 110.

In a manner similar to the RF signal input/output pad 200, the RF signal input/output pad 202 at the opposed end of the block 101 is comprised of an elongate rectangularly shaped strip or region of conductive material 210 which is formed on the exterior lower horizontal surface 104 of the block 101, extends around and bridges the corner defined between the lower horizontal surface 104 and the side exterior transverse end surface 112, and terminates on and extends into and is in direct unitary coupling or coupled relationship with the conductive material formed on the side exterior transverse end surface 112.

In the embodiment shown, the strip or region of conductive material 210 is surrounded on three sides by a generally U-shaped strip or region 220 on the exterior surface of the block 101 which is devoid of conductive material (i.e., a generally U-shaped strip or region of exposed dielectric material of the block 101 that surrounds all of the sides of the strip of conductive material 210 with the exception of the top side or end of the strip of conductive material 210 on the side exterior surface 112 of the block 101 which is unitary with and extends into and is in direct electrical coupling or coupled relationship with the remainder of the conductive material on the side exterior surface 112 and thus in direct electrical coupling or coupled relationship with the circuit of the filter 100).

More specifically, the strip or region 220 is comprised of a first region or strip 220a on the lower exterior block surface 104 that surrounds the portion of the strip of conductive material 210 formed on the lower exterior horizontal surface 104 of the block 101 and respective second regions or strips 220b and 220c of dielectric material which extend unitarily from opposed ends of the first region or strip 220a of dielectric material on the lower exterior block surface 104, are formed on the side exterior vertical end surface 112, and are located on opposed sides of the portion of the strip of conductive material 210 which is formed on the side exterior vertical end block surface 112.

In the filter embodiment 100, each of the respective second regions or strips 220b and 220c of dielectric material of each of the respective RF signal input/output pads 200 and 202 has a width greater than the width of the first region or strip 220a of dielectric material located on the bottom exterior surface 104.

In accordance with the invention, in the filter embodiment 100, the length and/or width of the strip or region of dielectric material 220 including for example the length and/or width of the respective second regions or strips 220b and 220c of the strip of dielectric material 220 and/or the length and/or width of the strip of conductive material 210 of each of the respective RF signal input/output pads 200 and 202 and, more specifically, the length and/or width of the portion or end of the strip of conductive material on the respective block exterior end surfaces 110 and 112 can be adjusted to allow for the adjustment of the RF signal input/output coupling to the outside circuit including for example a decrease in the insertion loss of the filter 100.

Figure 3:
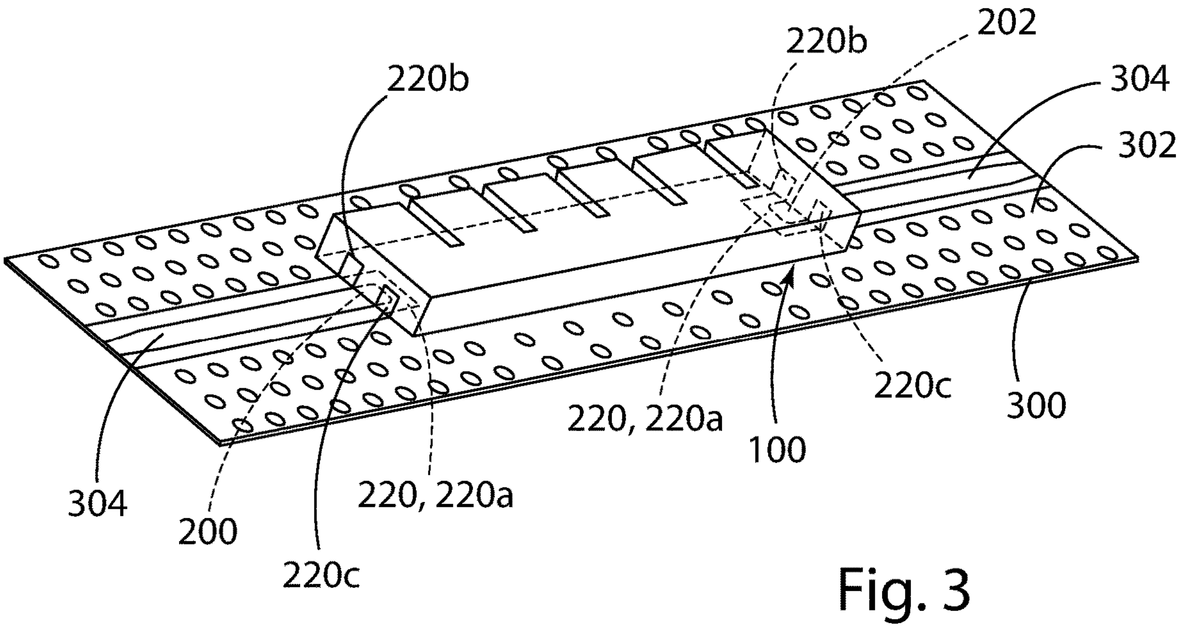
FIG. 3 is a perspective view depicting the RF dielectric waveguide filter of FIGS. 1 and 2 mounted on the surface of a printed circuit board.

The filter 100 is adapted to be surface mounted to the top exterior surface 302 of a mother printed circuit board 300 as shown in FIG. 3. In the embodiment shown, the top exterior surface 302 of the mother printed circuit board 300 includes a generally centrally located elongate strip of conductive material 304 formed thereon. The filter 100 is seated on the top exterior surface 302 of the mother printed circuit board 300 in a relationship with the portion of the respective strips of conductive material 210 of the respective RF signal input/output pads 200 and 202 of the filter 100 located on the bottom exterior surface 104 seated and in contact with the strip of conductive material 304 formed on the top exterior surface 302 of the mother printed circuit board 300.

Figure 4:
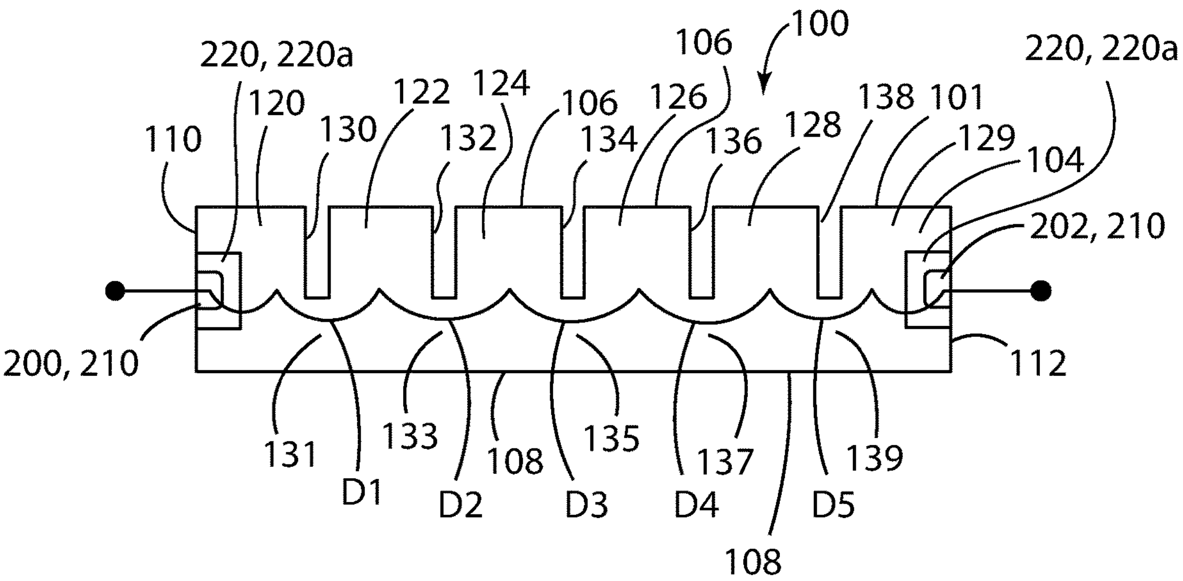
FIG. 4 is a bottom plan view of the RF dielectric waveguide filter shown in FIGS. 1 and 2.

FIG. 4 depicts the path of the RF signal through the block 101 of the filter 100 from the RF signal input/output pad 200, through each of the respective resonators 120, 122, 124, 126, 128, and 129 via the respective direct inductive coupling bridges defined by the respective slits or slots 130, 132, 134, 136, and 138 and out through the RF signal input/output pad 202.

Figure 5:
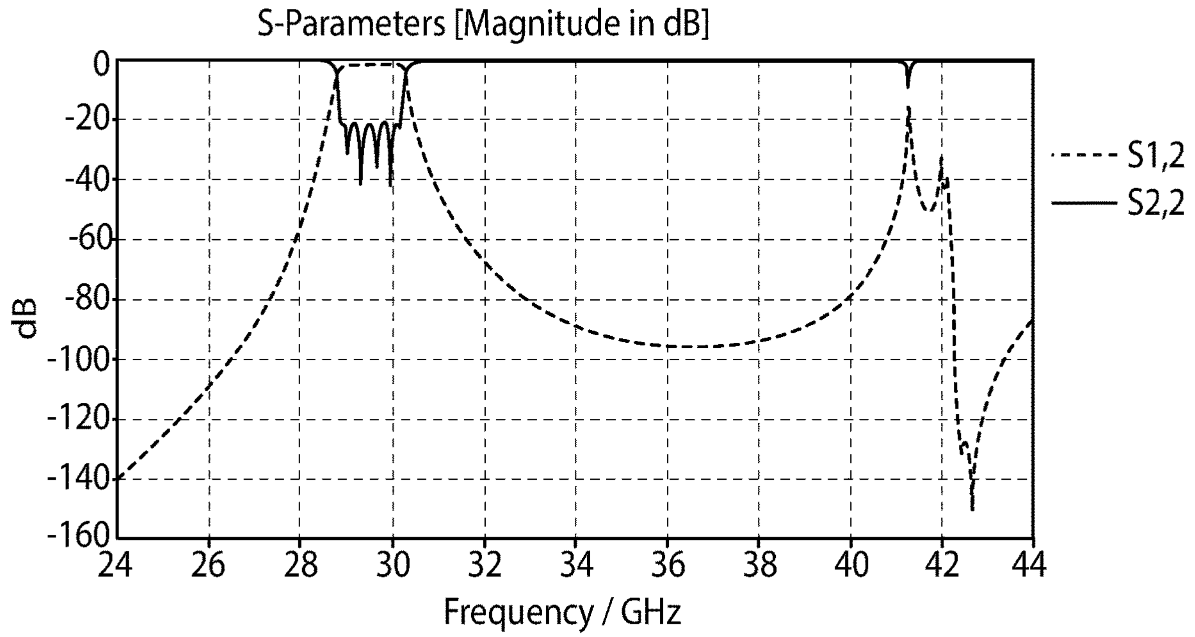
FIG. 5 is a graph of the performance of the RF dielectric waveguide filter of FIGS. 1 and 2.
Figure 6:
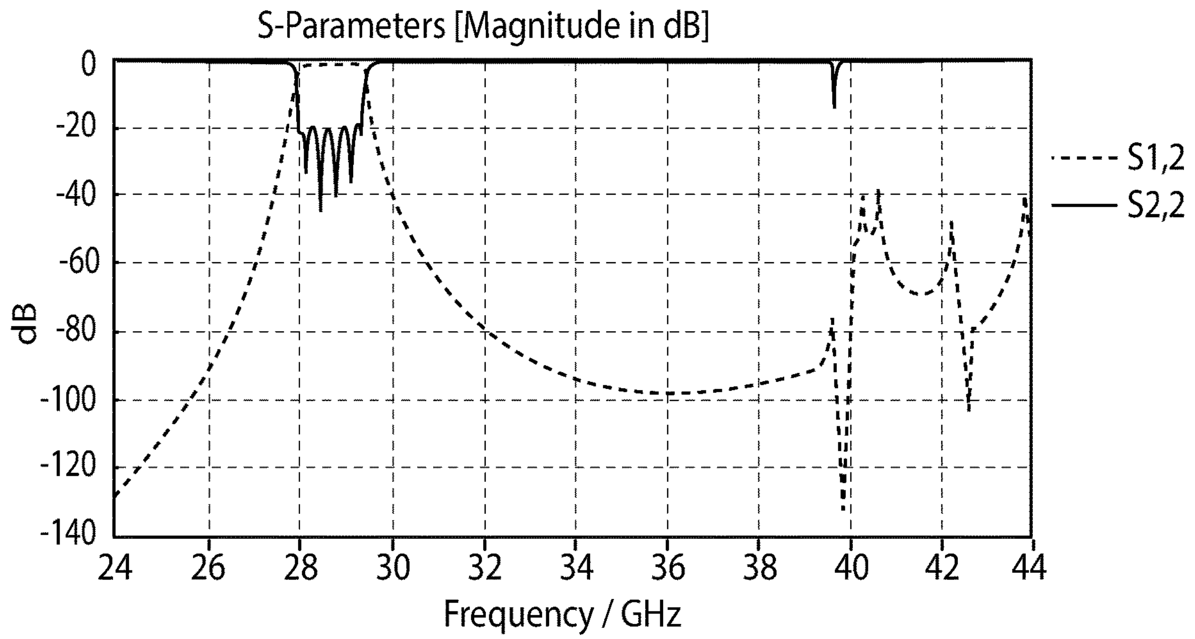
FIG. 6 is a graph depicting the increase in spurious rejection in response to adjustment of the resonator width/length ratio of the RF dielectric waveguide filter of FIGS. 1 and 2.

FIGS. 5 and 6 are graphs depicting the performance of the filter 100 of the present invention with FIG. 6 depicting the performance of the filter 100 in response to the adjustment of the RF input/output coupling as described in more detail above.

Figure 7:
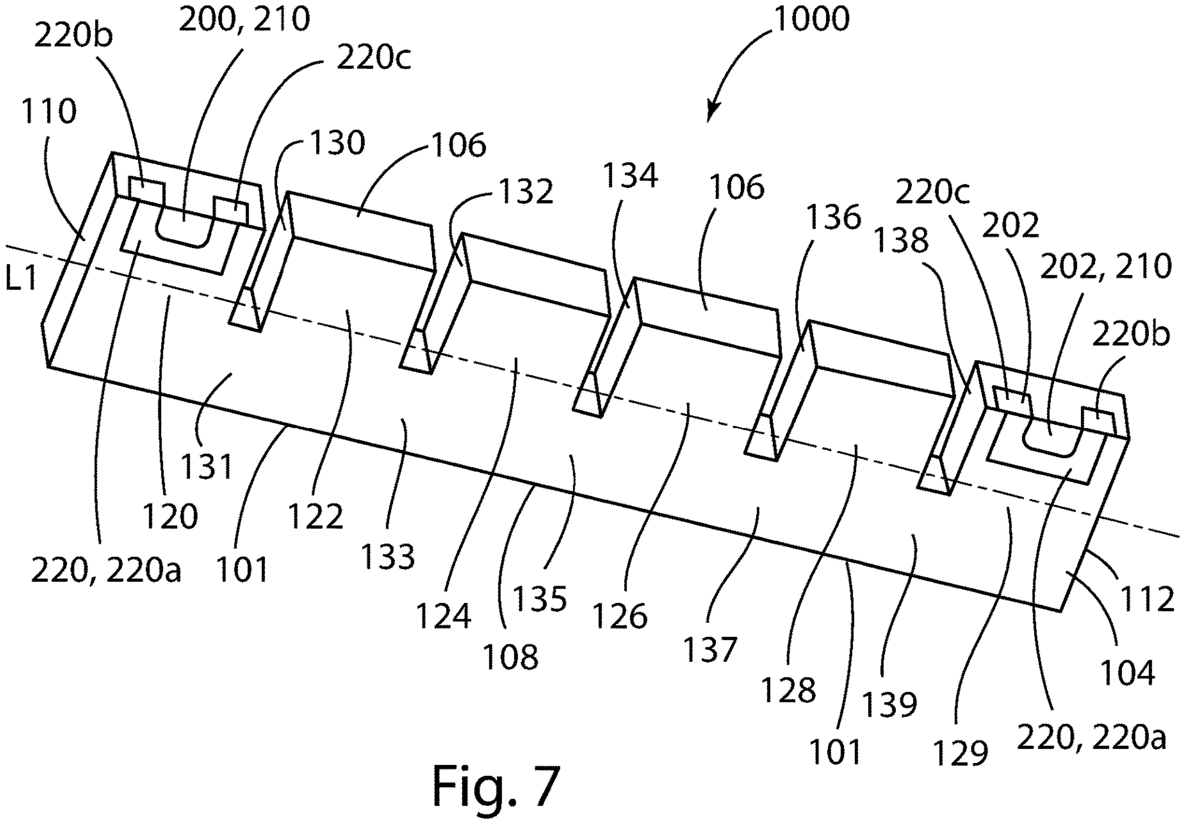
FIG. 7 is a bottom perspective view of another embodiment of an RF dielectric waveguide filter in accordance with the present invention.

FIG. 7 depicts another embodiment of the filter 1000 in accordance with the present invention in which the respective RF signal input/output pads 200 and 202 of the filter 100 are located on the respective end resonators 120 and 129 of the block 101 of the filter 100 in an orientation wherein the respective signal input/output pads 200 and 202 extend between and bridging the bottom exterior horizontal block surface 104 and the side exterior vertical longitudinal block surface 106 rather than bridging the bottom exterior horizontal block surface 104 and the side exterior vertical transverse end block surfaces 110 and 112 as in the filter embodiment 100 of FIGS. 1 and 2.

The RF signal input/output pads 200 and 202 in the filter embodiment 1000 of FIG. 7 are otherwise identical in structure to the RF signal input/output pads 200 and 202 of the filter embodiment 100 and thus the earlier description and elements of the RF signal input/output pads 200 and 202 of the filter embodiment 100 is incorporated herein by reference with respect to the filter embodiment 1000.

More specifically, in the embodiment of FIG. 7, the RF signal input/output pads 200 and 202 are disposed in a diametrically opposed and co-linear relationship relative to each other and further in a relationship spaced and offset from the longitudinal axis L1 of the block 101.

Still more specifically, the RF signal input/output pad 200 on the filter 1000 is formed on the end resonator 120 and is comprised of an elongate generally rectangularly shaped strip or region of conductive material 210 which is formed on the exterior lower horizontal surface 104 of the block 101, extends around and bridges the corner defined between the lower horizontal surface 104 and the side exterior vertical longitudinal surface 106, and terminates on and extends into and is unitary and in direct electrical coupling relationship with the conductive material formed on the side exterior vertical longitudinal surface 106.

In the embodiment shown, the strip or region of conductive material 210 is surrounded on three sides by a generally U-shaped strip or region 220 on the exterior surface of the block 101 which is devoid of conductive material (i.e., a generally U-shaped strip or region of exposed dielectric material 220 of the block 101 that surrounds all of the sides of the strip of conductive material 210 with the exception of the top side or end of the strip of conductive material 210 on the side exterior vertical longitudinal surface 106 of the block 101 which is unitary with and in direct electrical coupling or coupled relationship with the remainder of the conductive material on the exterior surface 106 and thus in direct electrical coupling or coupled relationship with the block circuit).

More specifically, the strip or region 220 is comprised of a first region or strip 220a on the lower exterior block surface 104 that surrounds the portion of the strip of conductive material 210 formed on the lower exterior horizontal surface 104 of the block 101 and respective second regions or strips 220b and 220c of dielectric material which extend unitarily from opposed ends of the first region or strip 220a of dielectric material on the lower exterior block surface 104, are formed on the side exterior vertical longitudinal surface 106, and are located on opposed sides of the portion of the strip of conductive material 210 which is formed on the side exterior vertical longitudinal block surface 106.

In a manner similar to the RF signal input/output pad 200, the RF signal input/output pad 202 on the filter 1000 is formed on the opposed end resonator 129 and is comprised of an elongate strip or region of conductive material 210 which is formed on the exterior lower horizontal surface 104 of the block 101, extends around the corner defined between the lower horizontal surface 104 and the side exterior vertical longitudinal surface 106, and terminates on and extends into and is unitary with the conductive material formed on the side exterior vertical longitudinal surface 106.

In the embodiment shown, the strip or region of conductive material 210 is surrounded on three sides by a generally U-shaped strip or region 220 on the exterior surface of the block 101 which is devoid of conductive material (i.e., a generally U-shaped strip or region of exposed dielectric material of the block 101 that surrounds all of the sides of the strip of conductive material 210 with the exception of the top side or end of the strip of conductive material 210 on the side exterior vertical longitudinal surface 106 of the block 101 which is unitary with and in direct electrical coupling or coupled relationship with the remainder of the conductive material of the side exterior surface 106 and thus in direct electrical coupling or coupled relationship with the remainder of the filter electrical circuit).

More specifically, the strip or region 220 is comprised of a first region or strip 220*a* on the lower exterior block surface 104 that surrounds the portion of the strip of conductive material 210 formed on the lower exterior horizontal surface 104 of the block 101 and respective second regions or strips 220*b* and 220*c* of dielectric material which extend unitarily from opposed ends of the first region or strip 220*a* of dielectric material on the lower exterior block surface 104, are formed on the side exterior vertical longitudinal surface 106, and are located on opposed sides of the portion of the strip of conductive material 210 which is formed on the side exterior vertical longitudinal block surface 106.

In the filter embodiment 1000, each of the respective second regions or strips 220*b* and 220*c* of dielectric material of each of the respective RF signal input/output pads 200 and 202 has a width greater than the width of the first region or strip 220*a* of dielectric material on the bottom exterior surface 104.

In accordance with the invention, in the filter embodiment 1000, the length and/or width of the strip or region of dielectric material 220 including for example the length and/or width of the respective second regions or strips 220*b* and 220*c* of the strip of dielectric material 220, and the length and/or width of the strip of conductive material 210 of each of the respective RF signal input/output pads 200 and 202 and, in particular, the length and/or width of the portion or end of the strip of conductive material 210 located on the block side surface 106 can be adjusted to allow for the adjustment of the RF signal input/output coupling to the outside circuit including for example a decrease in the insertion loss of the filter 1000.

Moreover, in both of the filter embodiments 100 and 1000, by adjusting the width and/or length of the respective resonators 120 and 129 which include the respective input/output pads 200 and 202 while keeping the fundamental frequency the same, the 2nd harmonic frequency can be adjusted and the same 2nd harmonic resonance become transmission zeros due to the coupling path and connection of the respective input/output pads 200 and 202 on the respective block side surfaces 110, 112, and 106.

While the invention has been taught with specific reference to the embodiments shown, it is understood that a person of ordinary skill in the art will recognize that changes can be made in form and detail without departing from the spirit and the scope of the invention. The described embodiments are to be considered in all respects only as illustrative and not restrictive.

For example, it is understood that the respective RF signal input/output pads 200 and 202 can be located and oriented on the bottom horizontal longitudinal exterior surface 104 of the respective filter embodiments 100 and 1000 in a relationship and orientation similar to filter embodiment 1000 except with the RF signal input/output pads 200 and 202 extending between the bottom horizontal longitudinal exterior surface 104 and the opposed side vertical longitudinal exterior surface 108.

It is further understood that the invention encompasses any one or more of several different embodiments in which the respective RF signal input/output pads 200 and 202 extend or bridge between the bottom horizontal longitudinal exterior surface and one of the exterior side surfaces 106, 108, 110, or 112 depending on the particular or desired direct PCB mounting application.

We claim:

1. A RF dielectric filter comprising:

a block of dielectric material including a plurality of exterior surfaces including top and bottom exterior longitudinal surfaces, opposed side exterior longitudinal surfaces, and opposed exterior end surfaces;

at least a first RF signal input/output pad extending between the bottom exterior surface and one of the opposed side exterior longitudinal surfaces or one of the opposed exterior end surfaces;

wherein the at least first RF signal input/output pad comprises:

an elongate strip of conductive material extending between the bottom exterior surface and one of the opposed side exterior longitudinal surfaces or one of the opposed exterior end surfaces; and a generally U-shaped strip of dielectric material surrounding all the sides of the elongate strip of conductive material except for a top side of the elongate strip of conductive material located on the one of the opposed side exterior longitudinal surfaces or the one of the opposed exterior end surfaces; and wherein a width of each of opposed portions of the strip of dielectric material located on the one of the opposed side exterior longitudinal surfaces or the one of the opposed exterior end surfaces is greater than a width of each of lengths of the strip of dielectric material located on the bottom exterior surface that extend to the opposing portions.

2. The RF dielectric filter of claim 1 further comprising a second RF signal input/output pad extending between the bottom exterior surface and the one of the opposed side exterior longitudinal surfaces or the other of the opposed exterior end surfaces.

3. The RF dielectric filter of claim 2 wherein the second RF signal input/output pad comprises:

an elongate strip of conductive material extending between the bottom exterior surface and one of the opposed side exterior longitudinal surfaces or the other of the opposed exterior end surfaces; and a strip of dielectric material surrounding all the sides of the elongate strip of conductive material except for one side of the elongate strip of conductive material located on the one of the opposed side exterior longitudinal surfaces or the other of the opposed exterior end surfaces.

4. The RF dielectric filter of claim 2 wherein the block of dielectric material defines a longitudinal axis, the first and second RF signal input/output pads being disposed in a diametrically opposed relationship at opposed ends of the block and further in a relationship co-linear with the longitudinal axis of the block of dielectric material.

5. The RF dielectric filter of claim 2 wherein the block of dielectric material defines a longitudinal axis, the first and second RF signal input/output pads being disposed in a diametrically opposed relationship at opposed ends of the block and further in a relationship spaced and off-set from the longitudinal axis of the block of dielectric material.

6. The RF dielectric filter of claim 1 wherein the block of dielectric material defines a plurality of resonators.

7. The RF dielectric filter of claim 6 wherein the block of dielectric material defines a plurality of direct RF signal couplings between the plurality of resonators.

8. The RF dielectric filter of claim 7 wherein the block includes a plurality of slots defined in the block of dielectric material and defining a plurality of bridges of dielectric material, the plurality of bridges defining the plurality of direct RF signal couplings between the plurality of resonators.

9. The RF dielectric filter of claim 1 wherein the block of dielectric material defines a plurality of resonators, the block of dielectric material defining a plurality of direct RF signal couplings between the plurality of resonators.

10. The RF dielectric filter of claim 1 wherein the width of each of the opposed portions of the strip of dielectric material at an edge of the one of the opposed side exterior longitudinal surfaces or the one of the opposed exterior end surfaces is greater than the width of each of the lengths of the strip of dielectric material at an edge of the bottom exterior surface.

11. The RF dielectric filter of claim 10 wherein the opposed portions of the strip of dielectric material have a rectangular shape on the one of the opposed side exterior longitudinal surfaces or the one of the opposed exterior end surfaces.

12. A RF dielectric filter comprising:

a block of dielectric material including top and bottom exterior longitudinal surfaces, opposed exterior end surfaces, and opposed side exterior surfaces covered with a layer of conductive material;

first and second RF signal input/output pads located at opposed ends of the block;

each of the RF signal input/output pads comprising a strip of conductive material bridging between the bottom exterior surface and the respective exterior end surface; and a strip of dielectric material surrounds all the sides of the elongate strip of conductive material except for one end of the strip of conductive material on the exterior end surface which is in a direct unitary coupling relationship with the remainder of the conductive material on the exterior end surface, wherein opposed portions of the strip of dielectric material located on the opposed exterior end surfaces each have a width greater than each of lengths of the strip of dielectric material located on the bottom exterior surface that extend to the opposed portions.

13. The RF dielectric filter of claim 12 further comprising:

a plurality of resonators defined on the block of dielectric material between the first and second RF signal input/output pads; and a plurality of slots defined in the block of dielectric material and defining a plurality of bridges of dielectric material, the plurality of bridges defining a plurality of direct RF signal couplings between the plurality of resonators.

14. The RF dielectric filter of claim 12 wherein the width of each of the opposed portions of the strip of dielectric material at an edge of the exterior end surface is greater than the width of each of the lengths of the strip of dielectric material at an edge of the bottom exterior surface that extend to the opposed portions.

15. The RF dielectric filter of claim 14 wherein the opposed portions of the strip of dielectric material have a rectangular shape on the exterior end surfaces.

16. An RF dielectric filter comprising:

a block of dielectric material including a plurality of exterior surfaces including top and bottom exterior longitudinal surfaces and exterior side surfaces;

a layer of conductive material covering the plurality of exterior surfaces of the block of dielectric material;

first and second RF signal input/output pads bridging the bottom exterior surface and an exterior side surface of the block of dielectric material;

wherein each of the first and second RF signal input/output pads comprises:

an elongate strip of conductive material bridging the bottom exterior surface and one of the exterior side surfaces and including an end unitary with the layer of conductive material on the exterior side surface; and a strip of dielectric material surrounding the elongate strip of conductive material with the exception of the end of the elongate strip of conductive material on the one exterior side surface which is unitary with the layer of conductive material on the one exterior side surface; wherein a width of opposing portions of the strip of dielectric material located on the one of the exterior side surfaces is greater than the width of each of lengths of the strip of dielectric material located on the bottom exterior surface that extend to the opposing portions.

17. The RF dielectric filter of claim 16 wherein the strip of dielectric material is generally U-shaped.

18. The RF dielectric filter of claim 16 wherein the width of each of the opposed portions of the strip of dielectric material at an edge of the one of the exterior side surfaces is greater than the width of each of the lengths of the strip of dielectric material at an edge of the bottom exterior surface.

19. The RF dielectric filter of claim 18 wherein the opposed portions of the strip of dielectric material have a rectangular shape on the one of the exterior side surfaces.

* * * * *